United States Patent [19]

Shtrikman

[11] 4,455,497

[45] Jun. 19, 1984

[54] LINEAR MOTION DEVICES

[75] Inventor: Shmuel Shtrikman, Rehovot, Israel

[73] Assignee: Yeda Research and Development Co., Ltd., Rehovot, Israel

[21] Appl. No.: 387,482

[22] Filed: Jun. 11, 1982

Related U.S. Application Data

[62] Division of Ser. No. 13,680, Feb. 21, 1979, Pat. No. 4,346,318.

[30] Foreign Application Priority Data

Feb. 22, 1978 [IL]  Israel .......................................... 54107

[51] Int. Cl.³ ............................................. H02K 33/12
[52] U.S. Cl. ........................................ 310/30; 417/417
[58] Field of Search ............................. 310/12, 14, 30; 417/416–418

[56] References Cited

U.S. PATENT DOCUMENTS

| | | | |
|---|---|---|---|
| 3,149,255 | 9/1964 | Trench | 310/30 |
| 3,268,747 | 8/1966 | Snowdon | 310/13 |
| 3,484,629 | 12/1969 | Kunz | 310/30 X |
| 3,495,147 | 2/1970 | Flora | 310/14 X |
| 3,606,595 | 9/1971 | Takamizawa | 310/30 X |
| 3,894,817 | 7/1975 | Majoros et al. | 310/30 X |
| 4,055,824 | 10/1977 | Baermann | 335/295 X |
| 4,185,262 | 1/1980 | Watanabe et al. | 335/303 X |
| 4,346,318 | 8/1982 | Shtrikman | 310/12 |
| 4,363,980 | 12/1982 | Petersen | 310/30 X |

FOREIGN PATENT DOCUMENTS

| | | |
|---|---|---|
| 718576 | 3/1942 | Fed. Rep. of Germany . |
| 1694776 | of 1954 | Fed. Rep. of Germany . |
| 1613758 | 1/1968 | Fed. Rep. of Germany . |
| 1538967 | 2/1970 | Fed. Rep. of Germany . |
| 266735 | 5/1950 | Switzerland . |
| 1220857 | 1/1971 | United Kingdom . |

OTHER PUBLICATIONS

Marger/Wagner "Elektronik Industrie" 4-1974.

*Primary Examiner*—Donovan F. Duggan
*Attorney, Agent, or Firm*—Sandler & Greenblum

[57] ABSTRACT

Apparatus for producing linear motion comprising a coil defining an electromagnetic field across a gap; and a permanent magnet disposed within the magnetic field in the gap and arranged to be driven in motion by the magnetic field, the permanent magnet being configured such that its axis of magnetization lies along its smallest dimension.

3 Claims, 20 Drawing Figures

LINEAR MOTION DEVICES

This is a division of application Ser. No. 13,680 filed Feb. 21, 1979, now U.S. Pat. No. 4,346,318.

FIELD OF THE INVENTION

The present invention relates to electromagnetic drive apparatus and more particularly to electromagnetic devices producing linear motion.

BACKGROUND OF THE INVENTION

Various types of linear motors are known in the art and are used for such diverse functions as driving a phonograph turntable and operating a compressor. There is shown in Austrian Pat. No. 195558 and in article by G. Perronne, entitled "Compresseurs Electromagnetiques Oscillants" appearing in the Bulletin Annexe (Suppl. 2) of the Institut International du Froid, 1958, Vol. 2, pp. 267–278, a compressor which employs a pair of oppositely magnetized permanent magnets disposed within the gap of an AC electromagnet. The magnets are spaced from each other along an axis extending through the gap and move in reciprocal motion along that axis. Although no information as to the efficiency of such compressors is available from the above references, it appears that they are relatively inefficient and require relatively high power electrical inputs.

SUMMARY OF THE INVENTION

The present invention seeks to provide a linear motor of relatively high efficiency which is suitable for powering a wide range of devices, while drawing relatively small amounts of power.

There is thus provided in accordance with an embodiment of the invention apparatus for producing linear motion comprising: a coil defining an electromagnetic field across a gap; and a permanent magnet disposed within the magnetic field in said gap and arranged to be driven in motion by the magnetic field, the permanent magnet being configured such that its axis of magnetization lies along its smallest dimension.

In accordance with a preferred embodiment of the invention, the permanent magnet comprises first and second sections, magnetized in respective opposite directions and securely joined together to define a single body or formed of a unitary element. The relative orientation of the two oppositely-magnetized sections determines the axis of motion of the permanent magnet in a plane perpendicular to the axis of electromagnetic flux across the gap. The provision of an AC current to the permanent magnet causes the permanent magnet to undergo oscillatory motion.

Oscillatory motion of amplitude greater than the dimensions of the oppositely magnetized sections of the permanent magnet may be provided by an array of joined oppositely magnetized sections disposed in association with a plurality of fixed electromagnets in a desired out-of phase arrangement. Suitable commutator apparatus, such as photodiode-operated relays for switching the field directions are required.

According to an embodiment of the invention employing a single magnetized section, vibrating systems exhibiting parametric excitation can be realized.

It is a particular feature of the invention that significantly higher efficiency is realized in accordance with the present invention as compared with prior art devices such as those described in the above references, as the result of the consideration of leakage flux. This consideration, absent in the prior art references, suggests an optimal relationship between gap separation and thickness of the permanent magnet along the axis of its magnetization.

BRIEF DESCRIPTION OF THE DRAWINGS

The invention will be more fully understood and appreciated from the following detailed description taken in conjunction with the drawings in which:

FIG. 7b is an illustration of a portion of the linear motion mechanism of FIG. 7a;

DETAILED DESCRIPTION OF PREFERRED EMBODIMENTS

Figure 1:
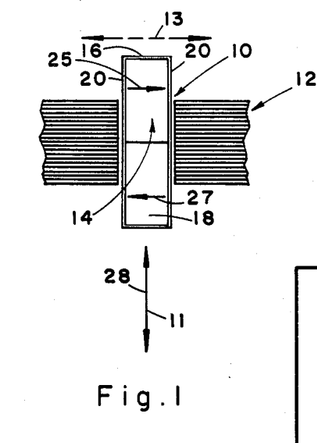
FIG. 1 is a schematic illustration of a portion of a linear motion mechanism constructed and operative in accordance with an embodiment of the invention.
Figure 2:
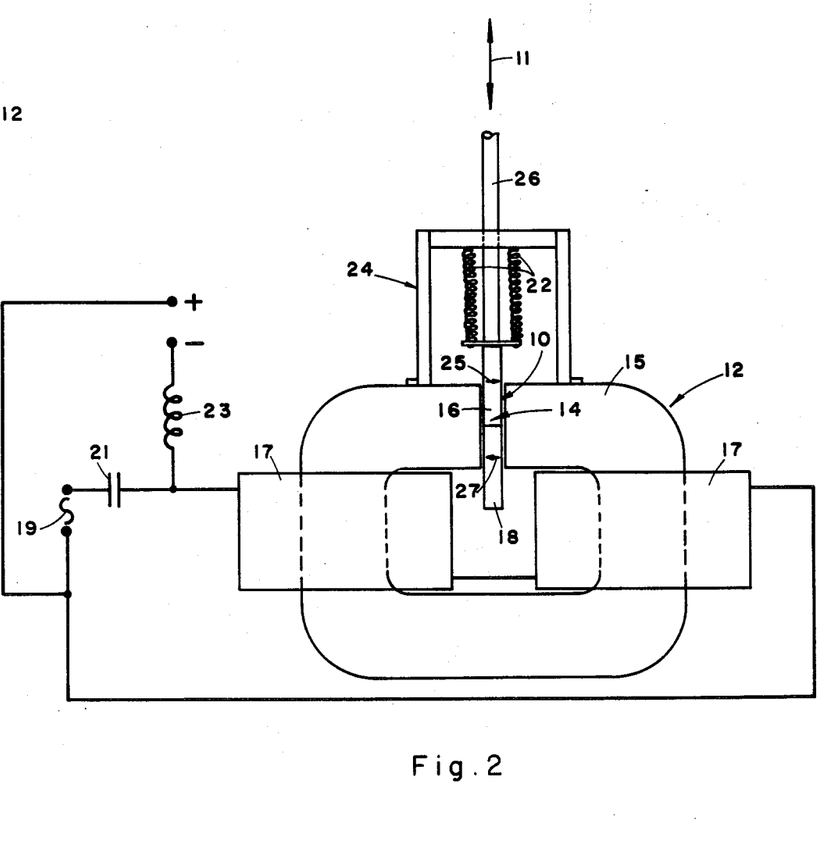
FIG. 2 is a schematic illustration of a linear motion mechanism of the same type as that illustrated in FIG. 1.

Reference is now made to FIGS. 1 and 2 which illustrate, with differing degrees of generality, a linear motion mechanism constructed and operative in accordance with an embodiment of the invention.

It is noted at the outset that although the invention will be described with reference to specific examples operative as linear drive devices, the invention is sufficiently general to include generators which produce an electrical current in response to an applied linear displacement of a permanent magnet. The terms linear motion device and linear motion mechanism will therefore be used to denote generators as well as motors.

Figure 3:
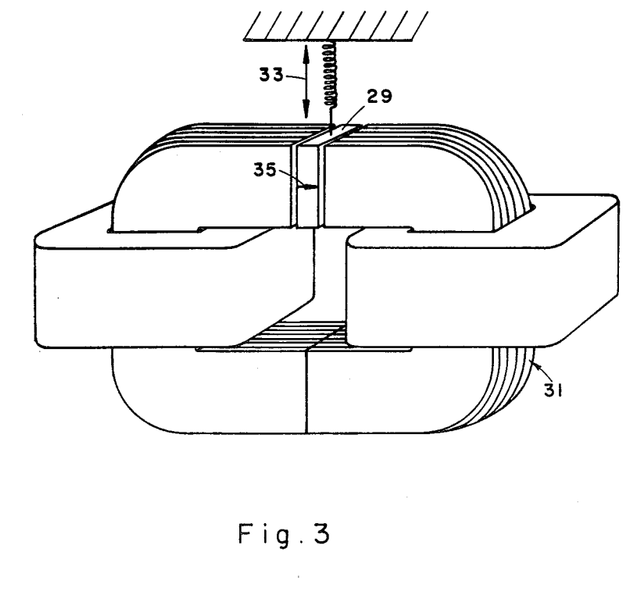
FIG. 3 is a schematic illustration of a linear motion mechanism constructed and operative in accordance with an alternative embodiment of the invention.

A gap 10 is defined by a conventional AC electromagnet 12. Magnetic flux is produced by the electromagnet across gap 10 along an axis 13. Electromagnet 12 comprises an iron core 15 around which are wound coils 17. The coils are coupled to an AC source 19 across a capacitor 21, provided to increase the power factor of the device. The coils may also be coupled to a D.C. voltage source across a resistance 23. Iron core 15 is preferably formed of a plurality of relatively thin layers laminated together. The laminations may be stacked along axes perpendicular to the flow of magnetic flux, so that the effects of eddy currents are reduced. One arrangement of stacked layers is illustrated in FIG. 1 while another possible arrangement is illustrated in FIG. 3.

Disposed in gap 10 for motion along an axis 11, lying perpendicular to magnetic flux axis 13, is a permanent magnet 14. In the illustrated embodiment, permanent magnet 14 is of generally sheet-like configuration and is magnetized along an axis perpendicular to the plane thereof. Permanent magnet 14 is formed of oppositely magnetized first and second portions 16 and 18 which are either formed of an integral piece of ferromagnetic material or alternatively are joined together as by adhesive. The two portions may be in touching engagement or alternatively spaced from each other by a desired amount of spacing. Additional structural strength may be achieved by laminating a plastic sheet 20 on both planar surfaces of the permanent magnet, as illustrated in FIG. 1.

As seen in FIG. 2, permanent magnet 14 is dimensioned to extend beyond gap 10 so as to avoid the balancing of magnetic forces thereon. Permanent magnet 14 may be mounted by means of springs 22 onto a support 24 mounted onto electromagnet 12. Springs 22 and support 24 are arranged to permit coupling of a drive shaft 26 onto permanent magnet 14 for driving engagement therewith.

It is appreciated that the permanent magnet moves to align the direction of magnetization thereof with the direction of the magnetic flux at any given time. In the illustrated embodiment, the permanent magnet 14 will move along axis 11 in a direction so as to maximize the overlap between the magnetic flux and the portion of the permanent magnet magnetized co-directionally therewith.

Thus during AC operation of the electromagnet, where the magnetic flux changes direction along axis 13, the permanent magnet undergoes periodic reciprocal motion along axis 11 as alternatively first and second portions align themselves with the flux. The directions of magnetization of the first and second portions are indicated by arrows 25 and 27 respectively.

It may be readily appreciated that if permanent magnet 14 were repositioned by ninety degrees in its plane so that portions 16 and 18 were positioned in side-by-side orientation instead of the up-down orientation illustrated in FIGS. 1 and 2, the axis of motion thereof would be displaced by ninety degrees to an axis 28, lying perpendicular to both axes 11 and 13. This alternative orientation of the portions of the permanent magnet has the advantage that the amplitude of motion of the permanent magnet is not limited by the propinquity of the bottom portion of the U-shaped electromagnet 12. The side-by-side orientation involves certain complications when it is sought to employ a plurality of similar electromagnets side-by-side in a scaled-up embodiment. This embodiment will be described later in the present specification.

Permanent magnet 14 should be of the oriented type and must be of high coercivity $_iH_C$, typically above 3000 oersted and must be of high remanence, typically above 3000 Gauss. Preferably the hysteresis loss associated with the minor loop traversed by the material during AC operation should be small. One example of a material suitable for construction of the permanent magnet is RAECO - 16, manufactured by the Raytheon Corporation of the U.S.A..

Although permanent magnet 14 is normally centered with the division between first and second portions 16 and 18 at the center of gap 10, it may alternatively be maintained off center by suitable selection of a D.C. input voltage to the electromagnet. This adjustability may be useful where the linear motion device is used to power equipment where the average or peak position of the moving member should be adjustable.

Reference is now made to FIG. 3 which shows a linear motion device similar in all relevant respects to that illustrated in FIG. 2 except in that it comprises a spring mounted permanent magnet 29 which is uniformly magnetized in a single direction. During AC operation of the electromagnet 31, permanent magnet 29 moves in reciprocal motion along an axis 33, perpendicular to the magnetization direction of the permanent magnet indicated by an arrow 35. This linear motion device operates in a parametric excitation regime at periodicities which are multiples of one-half of the excitation frequency. The spring is selected such that the resonance frequency of the vibrating system is one of the above multiples.

Eddy current losses in the permanent magnet may be reduced by the use of laminated constructions for the permanent magnets.

Figure 8A:
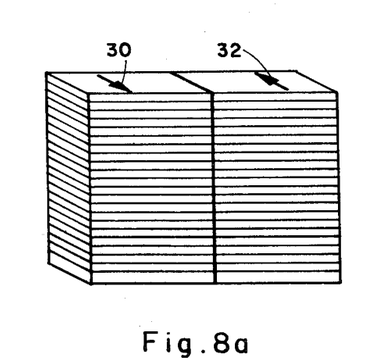
FIGS. 8a and 8b illustrate two variations of laminated permanent magnets usable in the linear motion mechanisms of the present invention.
Figure 8B:
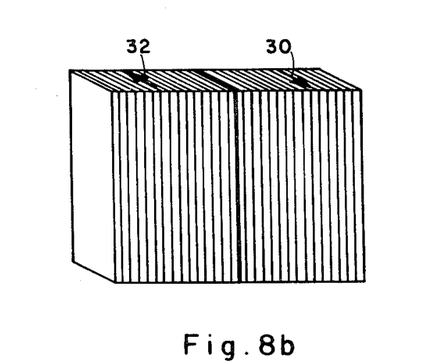

Reference is now made to FIGS. 8a and 8b which illustrate two alternative variations of permanent magnets formed by laminating or otherwise joining together a plurality of layers of magnetic material such as RAECO-16. In both cases, and in all cases of laminated magnets of interest here, the layers are stacked along axes perpendicular to the axis of magnetic flux of the electromagnet along which lie the directions of magnetization of the portions of the permanent magnets indicated by arrows 30 and 32 respectively. It may be appreciated that the embodiment illustrated in FIG. 8b has an advantage in the construction of permanent magnets having oppositely magnetized portions. In this embodiment the junction between the oppositely magnetized portions may be realized by an ordinary, or possibly strengthened, lamination.

Figure 4:
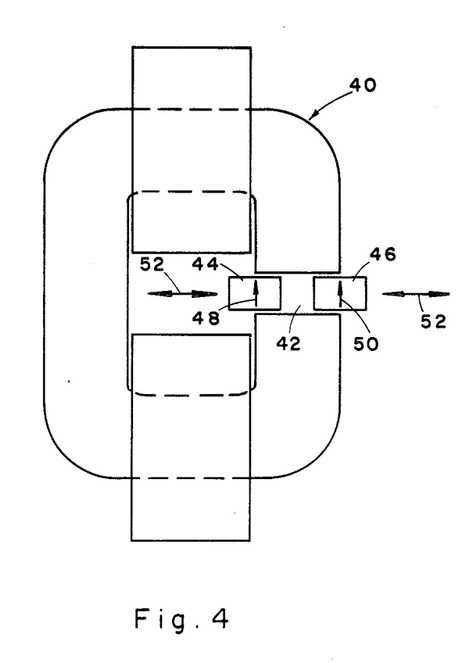
FIG. 4 is a schematic illustration of a balanced center-of-gravity linear motion mechanism constructed and operative in accordance with an embodiment of the invention.

An alternative embodiment of the invention, particularly suitable for applications in which co-ordinate motion of a pair of members is required, such as electrically powered scissors or clippers, is illustrated in FIG. 4. A conventional AC electomagnet 40, similar in all relevant respects to electromagnet 12 defines a gap 42. Disposed within gap 42 are first and second permanent magnets 44 and 46, both magnetized in the same direction as indicated by arrows 48 and 50. Permanent magnets 44 and 46 are each separately coupled by means (not shown) to driven means, such as opposing blades of a scissors or clipper mechanism.

During AC operation of electromagnet 40, when the direction of the magnetic flux is along arrows 48 and 50, permanent magnets 44 and 46 move together towards the center of the gap. When the direction of the magnetic flux is opposite to that indicated by arrows 48 and 50, permanent magnets 44 and 46 move away from each other. The axis of reciprocal motion of permanent magnets 44 and 46 are perpendicular to the axis of magnetic flux and are indicated by arrows 52. It is noted that the motion of permanent magnets 44 and 46 is such that their center of mass remains substantially static.

Figure 5:
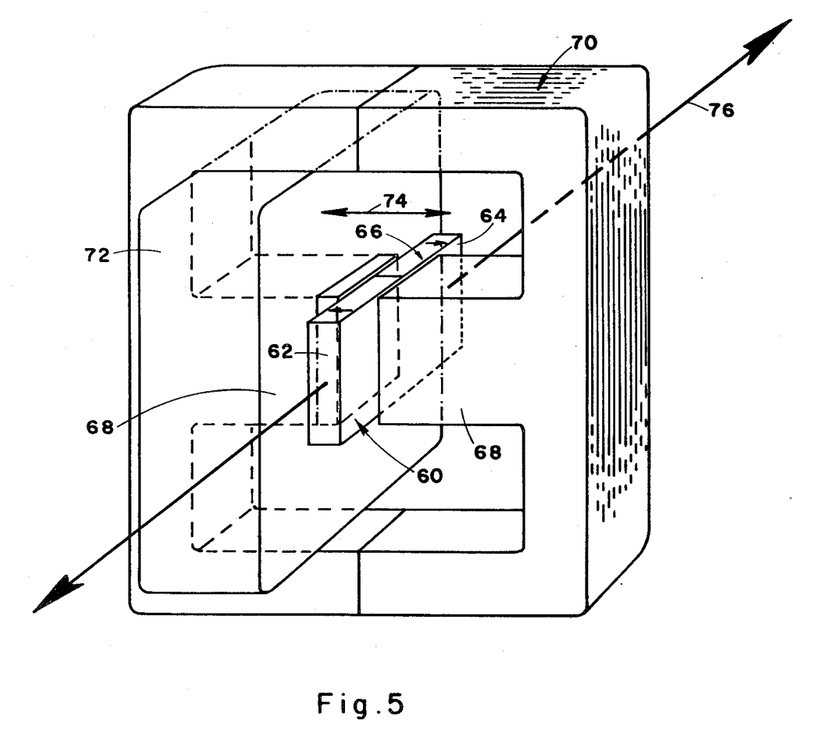
FIG. 5 is a schematic illustration of a linear motion mechanism constructed and operative in accordance with still another alternative embodiment of the invention.

Reference is now made to FIG. 5 which illustrates a linear motion mechanism constructed such that the motion of the permanent magnet is not limited by the presence of the iron core of the electromagnet. Here a permanent magnet 60 formed of oppositely magnetized portions 62 and 64 and similar in all relevant respects to permanent magnet 14 of FIGS. 1 and 2 is disposed within a gap 66 defined between the center arms 68 of an AC electromagnet 70. In the exemplary embodiment illustrated in FIG. 5 the electromagnet comprises a core in the general shape of a closed rectangular having central arms which are spaced from each other. Coils 72, only one of which is shown in FIG. 5 for the sake of clarity, we wound about the central arms 68 and are coupled to power sources in a manner similar to the connection of electromagnet 12 described in connection with FIG. 2 hereinabove.

During AC operation of the electromagnet, magnetic flux is generated across gap 66 along an axis 74 along which are magnetized portions 62 and 64 of permanent magnet 60. The changes in direction in magnetic flux cause permanent magnet 60 to undergo periodic reciprocal motion along an axis 76 perpendicular to axis 74.

It is noted that the side-by-side orientation of the portions 62 and 64 of permanent magnet 60 results in motion which is not limited by the geometry of the electromagnet core since the travel path of the permanent magnet along axis 76 does not intersect any of the electromagnet structure. The embodiment of FIG. 5 is also characterized by the presence of relatively small fringing fields, thus enhancing the electromagnetic compatibility and increasing the magnetic efficiency, as compared with the prior art. The embodiment of FIG. 5 also displays a greater structural rigidity and resistance to fatigue than typical C-shaped embodiments, such as that illustrated in FIG. 3.

Figure 6:
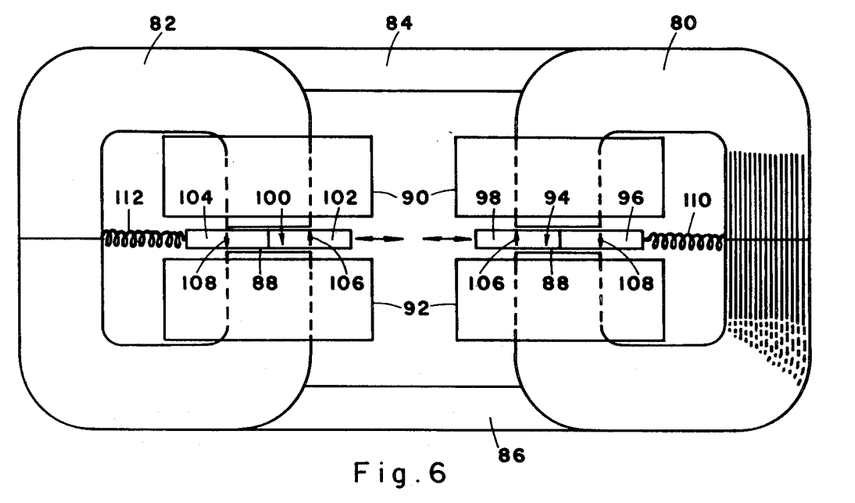
FIG. 6 is a schematic illustration of a balanced center-of-gravity linear motion mechanism constructed and operative in accordance with an alternative embodiment of the invention.

Referring now to FIG. 6 there is seen another embodiment of a static center of mass linear motion mechanism constructed and operative in accordance with an embodiment of the invention. A pair of generally C-shaped electromagnets 80 and 82 are joined together in fixed spatial relationship by means of securing members 84 and 86. Each of electromagnets 80 and 82 is formed of a C-shaped soft iron core which defines a gap 88. Adjacent the gap are disposed coils 90 and 92. Coils 90 and 92 are connected to an AC power source in parallel in-phase relationship such that electromagnets 80 and 82 operate identically and in phase.

Disposed in gap 88 of electromagnet 80 and extending therebeyond is a permanent magnet 94 comprising oppositely magnetized portions 96 and 98. Similarly disposed in gap 88 of electromagnet 82 and extending therebeyond is a permanent magnet 100 comprising oppositely magnetized portions 102 and 104. Adjacent portions 98 and 102 of respective permanent magnets 94 and 100 are magnetized in the same direction, indicated by arrows 106, while exterior portions 96 and 104 of respective permanent magnets 94 and 100 are also magnetized in an identical direction, indicated by arrows 108 and being opposite to the direction indicated by arrows 106.

Permanent magnets 94 and 100 are mounted on respective springs 110 and 112 which are attached to the cores of respective electromagnets 80 and 82.

It is appreciated that during in phase AC operation of electromagnets 80 and 82 respective permanent magnets 94 and 100 engage in periodic reciprocal motion either towards or away from each other and such that the center of mass of the permanent magnets remains substantially static.

In the illustrated embodiment and in the embodiment of FIG. 2 it is desirable that the springs supporting the permanent magnet be selected to reach their resonance at the desired operating frequency and normally to center the permanent magnet in the gap.

Figure 7A:
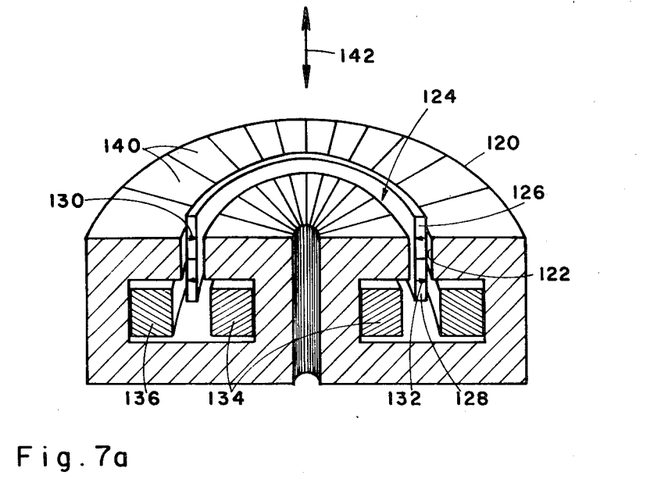
FIG. 7a is an illustration of a generally circularly configured linear motion mechanism constructed and operative in accordance with an embodiment of the invention.
Figure 7B:
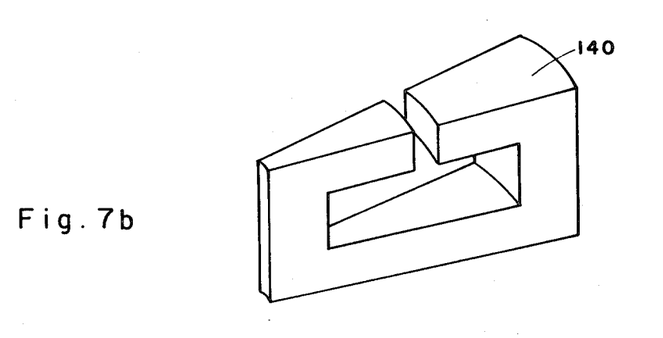

Reference is now made to FIGS. 7a and 7b which illustrate a linear motion mechanism constructed and operative in accordance with an embodiment of the invention and employing a curved permanent magnet. A generally disc shaped electromagnet 120 is illustrated in cut-away pictorial view defining a generally circular gap 122 in which is disposed a permanent magnet 124 of generally circular cross section.

Permanent magnet 124 is formed of first and second generally cylindrical portions, magnetized in opposite directions, arranged to define upper and lower rings 126 and 128 whose magnetization directions are indicated by respective arrows 130 and 132. Inner and outer coils 134 and 136 are disposed in a generally annual recess centered beneath gap 122 and are coupled to an AC source by means not shown. The configuration of electromagnet 120 is defined by a generally annular core desirably formed of high resistivity, low lose transformer iron or a similar material.

According to a preferred embodiment of the invention the core is formed by laminating a multiplicity of thin segments 140, such as those illustrated, not necessarily to scale, in FIG. 7b. It is noted that the laminated construction in this and other embodiments illustrated herein which serves to greatly reduce effects of eddy currents.

During AC operation of the electromagnet 120, permanent magnet 124 moves in periodic reciprocal motion along an axis 142 extending perpendicular to the magnetic flux lines across the gap.

According to an alternative embodiment of the invention representing a variation of the embodiment illustrated in FIGS. 7a and 7b, an electromagnet may be formed to define a generally conical gap and a suitably configured permanent magnet having oppositely magnetized portions may be disposed therein for motion relative thereto.

It may be appreciated that the embodiment illustrated in FIGS. 7a and 7b represents the end point of a generalization of the linear motion mechanisms of the invention to multi-gap embodiments. Instead of employing a circular gap and a circular cylindrical permanent magnet as in the embodiment of FIG. 7a, one may employ a rectangular cylindrical permanent magnet and four separate electromagnets. As a further alternative a plurality of separate permanent magnets may be joined together either conductively or insulatively for common movement each relative to a corresponding electromagnet. Such an embodiment is illustrated in FIGS. 9a and 9b.

Figure 9A:
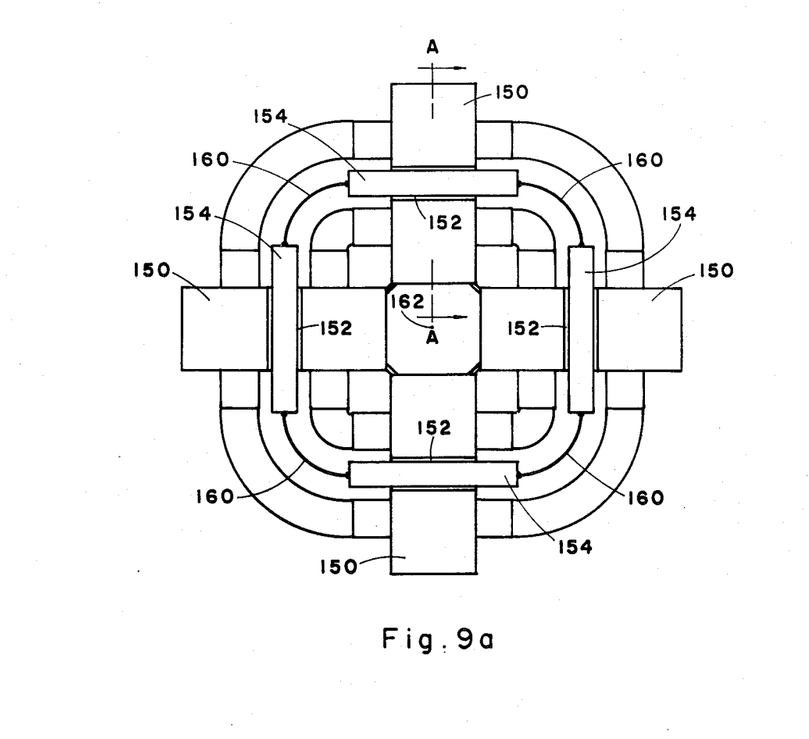
FIG. 9a is a schematic top view illustration of a linear motion mechanism constructed and operative in accordance with an embodiment of the invention.
Figure 9B:
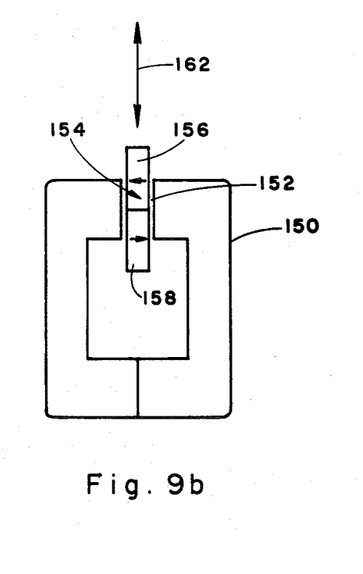
FIG. 9b is a sectional illustration of a portion of the mechanism of FIG. 9a taken along the lines A—A.

Referring now to FIGS. 9a and 9b it is seen that four electromagnets 150 are disposed at a ninety-degree separation from one another to define a generally rectangular arrangement. The electromagnets may be conventional electromagnets such as that illustrated in FIG. 2 and are coupled to an AC power source in a manner similar to the coupling of the electromagnet in FIG. 2 and such that all of electromagnets 150 operate in phase with each other.

Electromagnets 150 each define a gap 152 in which is disposed a permanent magnet 154 having oppositely magnetized portions 156 and 158, as illustrated particularly in FIG. 9b. During AC operation of the electromagnets 150, permanent magnets 154, which are rigidly joined together by coupling members 160, undergo periodic reciprocal motion along an axis 162.

Figure 10:
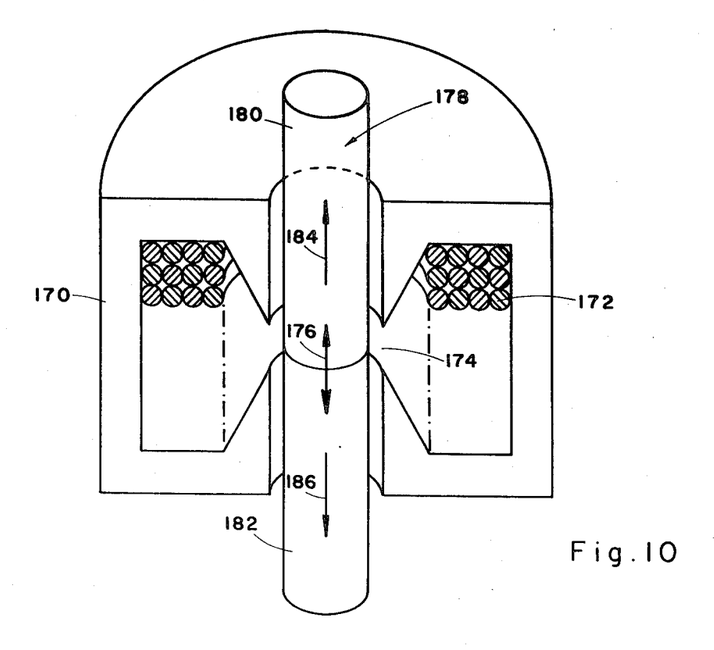
FIG. 10 is a schematic illustration of a linear motion mechanism constructed and operative in accordance with an embodiment of the invention.

Reference is now made to FIG. 10 which illustrates a linear motion device comprising a generally annular electromagnet 170 having a centrally disposed coil 172 and defining a generally cylindrical gap 174 across with the magnetic flux lines extend along an axis 176. A generally elongate permanent magnet 178, which may be cylindrical as illustrated or of any other suitable configuration, is disposed within an axial passageway defined at the center of electromagnet 170.

Permanent magnet 178 comprises first and second oppositely magnetized portions 180 and 182 and may be formed of high remanence ferromagnetic material such as RAECO-16. It is noted that portions 180 and 182 are magnetized in opposite directions along axis 176, indicated by arrows 184 and 186.

Coil 172 is coupled to a source of alternating current, preferably across a capacitor, not shown, and in a manner similar to the coupling of electromagnet 12 of FIG. 2. When electromagnet 170 undergoes AC operation, permanent magnet 178 moves in periodic reciprocal motion along axis 176.

Figure 11:
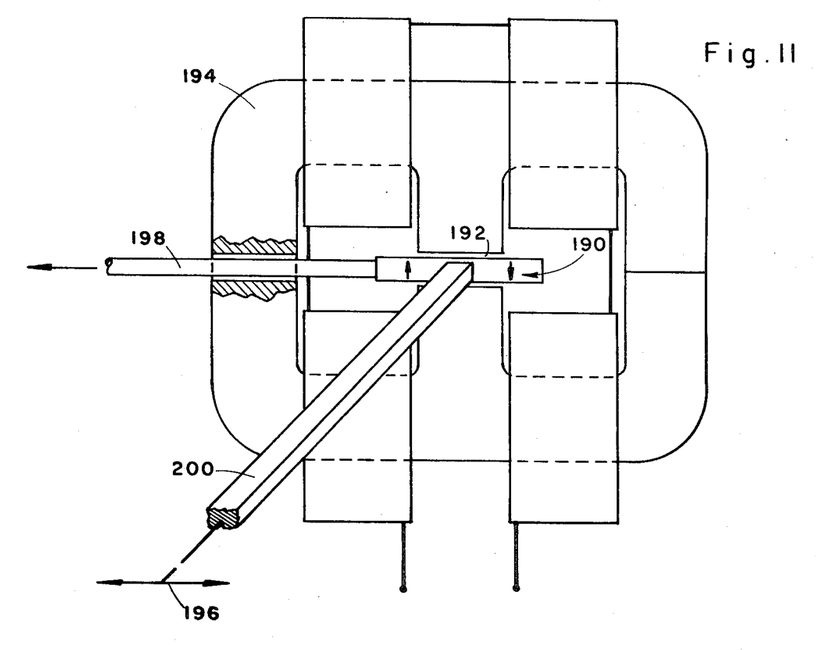
FIG. 11 is a schematic illustration of a linear motion mechanism constructed and operative in accordance with another embodiment of the invention.

Reference is now made to FIG. 11 which illustrates an alternative version of the linear motion apparatus illustrated in FIG. 5. Here in contrast to the embodiment of FIG. 5, a permanent magnet 190 is disposed in a gap 192 and arranged with respect to the electromagnet core 194 such that the motion of the permanent magnet is along an axis 196 and is limited in amplitude by the propinquity of the core 194.

FIG. 11 illustrates two ways of coupling the movable permanent magnet to an external member in driving relationship. A drive shaft 198, coupled to permanent magnet 190 may extend through a passageway formed in core 194. Alternatively or additionally a second drive shaft 200 may be coupled to the side of permanent magnet 190 and extend sideways therefrom.

The coil arrangement illustrated in FIG. 11 represents an alternative to the arrangement shown in FIG. 5.

Figure 12:
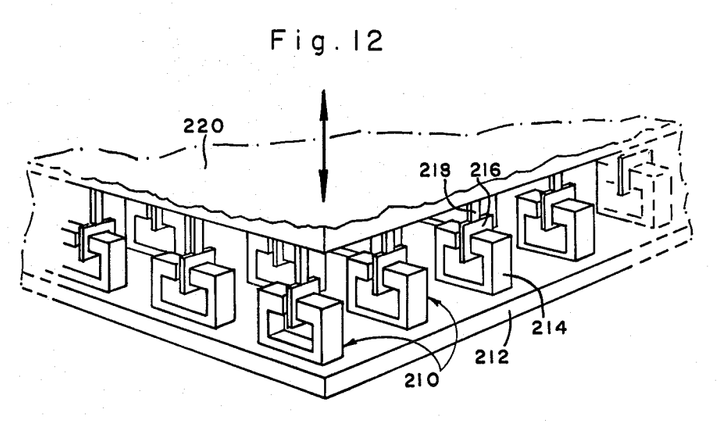
FIG. 12 is a schematic illustration of a scaled-up version of a linear motion mechanism constructed and operative in accordance with an embodiment of the invention.

Reference is now made to FIG. 12 which illustrates a vibrating surface mechanism constructed and operative in accordance with an embodiment of the invention. A plurality of individual linear motion mechanisms 210 are mounted onto a base 212. Each of the individual linear motion mechanisms may be constructed similarly in all relevant respects to the linear motion mechanism illustrated in FIG. 2 and described hereinabove.

Each linear motion mechanism 210 comprises an electromagnet 214, a permanent magnet 216 having upper and lower oppositely magnetized portions and a drive shaft 218 coupled to the permanent magnet. The drive shafts 218 of the plurality of linear motion mechanisms are all coupled to an upper surface 220. The individual electromagnets are coupled to an AC source in a manner similar to that illustrated in FIG. 2 and such that all of the electromagnets 214 operate substantially in phase. When electromagnets 214 undergo AC operation surface 220 is caused to vibrate relative to surface 212.

Figure 13:
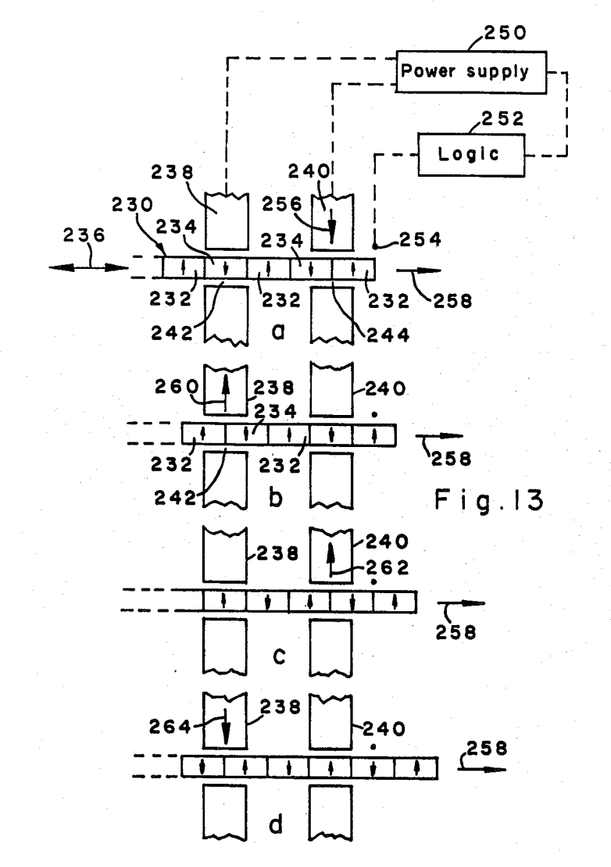
FIG. 13 is a schematic illustration of four stages in the operation of a large amplitude linear motion mechanism constructed and operative in accordance with an embodiment of the invention.

Reference is now made to FIG. 13 which illustrates a large amplitude linear motion device constructed and operative in accordance with an embodiment of the invention. A permanent magnet 230 comprising a plurality of alternating first and second uniform oppositely magnetized portions 232 and 234 fixedly joined together in side by side relationship and disposed in a plane is disposed along an axis 236. At least two electromagnets 238 and 240 are arranged to define respective gaps 242 and 244 along axis 236. Electromagnets 238 and 240 are spaced from each other along axis 236 so as to lie "out of phase" by one-half portion length. Thus, as seen in stage a of FIG. 13, when portion 234 is fully aligned with gap 242, one half of adjacent portions 234 and 236 is aligned with gap 244.

Electromagnets 238 and 240 are coupled to a power supply 250, such as a DC power supply whose operation is governed by logic circuitry 252 such as a commutator switch operated in turn by a sensor 254, such as an optical or magnetic sensor. Electromagnets 238 and 240 are operated interchangeably. Their operation may be understood by considering the sequence of stages a–d illustrated in FIG. 13.

Referring to stage a, it is seen that the junction between portions 232 and 234 is centered in gap 244. Electromagnet 240 is then operated to provide magnetic flux in a direction indicated by an arrow 256, causing portion 234 to become aligned with the magnetic flux direction and centered in gap 244, resulting in a net movement of one-half portion length in a direction indicated by an arrow 258. The permanent magnet 230 is now positioned as illustrated in stage b. It may be appreciated that a stepping operation may be provided by the apparatus of FIG. 13.

Sensor 254 senses the repositioning of the permanent magnet by one-half portion length and terminates the power supply to electromagnet 240. As noted above, sensor 254 may be an optical sensor which may be responsive to optical coding on the portions of the permanent magnet Alternatively it may determine position by sensing the direction and strength of magnetization of the adjacent portion of the permanent magnet.

Once the permanent magnet is at stage b, the logic circuitry causes power supply 250 to energize electromagnet 238 to provide magnetic flux in a direction indicated by an arrow 260, causing portion 232 to be aligned with gap 242 producing a net movement of the permanent magnet by one-half portion length in a direction indicated by arrow 258.

The permanent magnet is now positioned at stage c and the logic circuitry 252 in response to the output of sensor 254 causes the power supply to deenergize electromagnet 238 and to energize elecrtomagnet 240 to produce magnetic flux in a direction indicated by an arrow 262, causing the permanent magnet to move in the direction indicated by arrow 258 by another one-half portion length to stage d.

At stage d, the logic circuitry deenergizes electromagnet 240 and energizes electromagnet 238 in a direction 264 causing the permanent magnet to move forward by a further one-half portion length and to be positioned with respect to the electromagnets in an arrangement analogous to stage a. Continued forward movement of the permanent magnet in the direction indicated by arrow 258 occurs in substantially the same sequence as described hereinabove.

It is appreciated that the amplitude of motion is limited only by the portion length and the number of portions contained in a given permanent magnet. The direction of motion may be reversed by reversing the direction of the magnetic flux produced by the electromagnets at each stage.

Figure 14:
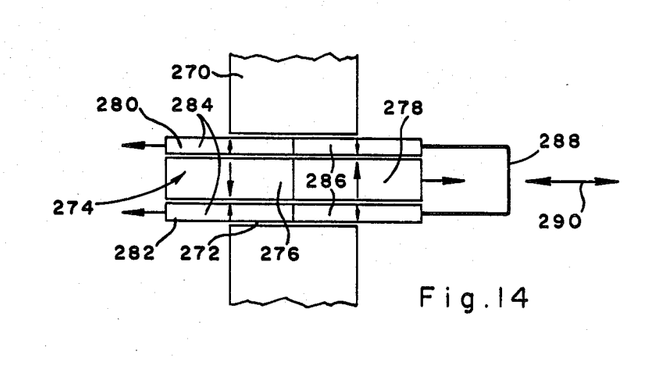
FIG. 14 is a schematic illustration of a portion of a linear motion mechanism constructed and operative in accordance with an embodiment of the invention.

Reference is now made to FIG. 14 which illustrates a balanced center-of-mass linear motion mechanism constructed and operative in accordance with an embodiment of the invention. An electromagnet 270 defines a gap 272. Disposed in gap 272 is a first permanent magnet 274 having oppositely magnetized portions 276 and 278. Disposed on both sides of permanent magnet 274 are a pair of second permanent magnets 280 and 282, each of which comprises a pair of oppositely magnetized portions 284 and 286.

It is noted that the magnetization directions of adjacent portions 276 and 284 are opposite as are the magnetization directions of adjacent portions 278 and 286. Second permanent magnets 280 and 282 are rigidly coupled together for common movement by a joining member 288.

The particular arrangement illustrated here prevents the permanent magnets from being attracted to one or the other pole of the electromagnet and engage in frictional contact therewith. Such contact would greatly impair the operation of the linear motion device.

When electromagnet 270 is coupled to a source of AC power for AC operation the first permanent magnet and the second permanent magnets move in reciprocal periodic motion in opposite directions along an axis 290 and such that the center of mass of the permanent magnets remains substantially static.

Figure 15:
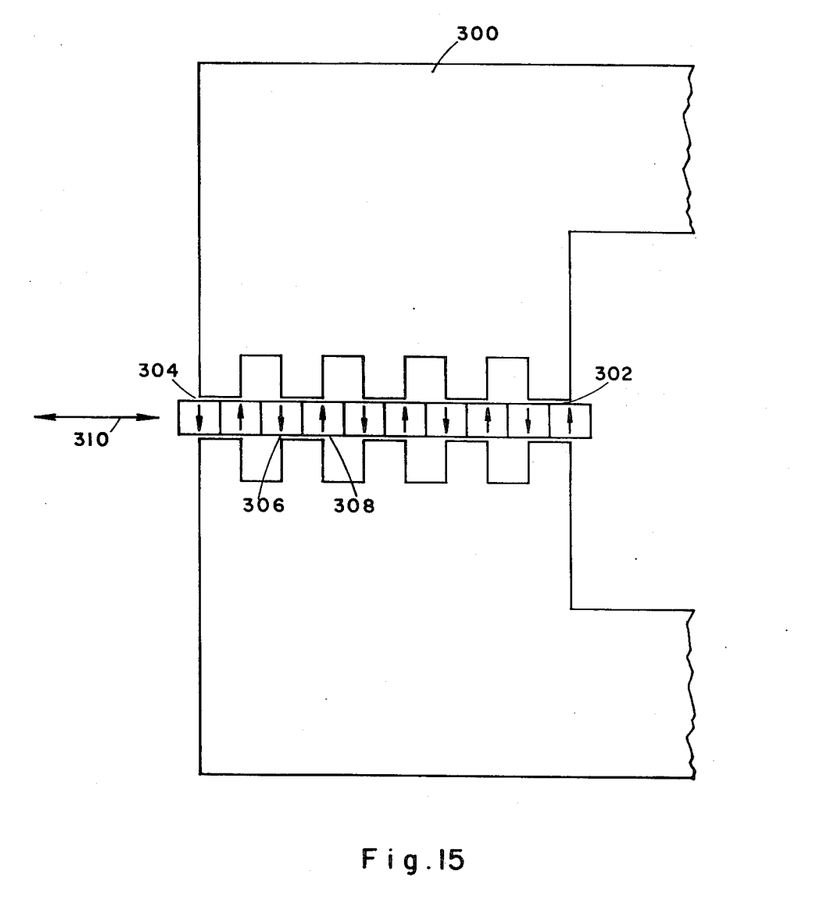
FIG. 15 is a schematic illustration of a scaled up linear linear motion mechanism constructed and operative in accordance with an embodiment of the invention.

Reference is now made to FIG. 15 which illustrates a scaled-up linear motion mechanism constructed and operative in accordance with an embodiment of the invention. A conventional C-shaped electromagnet 300 defines a plurality of substantially identical spaced gaps 302. A permanent magnet 304 comprising a plurality of oppositely magnetized portions 306 and 308 arranged in alternating disposition in a straight line is disposed along an axis 310 extending along the gaps 302.

The average position of the permanent magnet with respect to the gaps 302 is illustrated and it is noted that the permanent magnet and the gaps are dimensioned and positioned such that every second junction between adjacent portions 306 and 308 is centered in a gap 302. Stated alternatively, each gap is centered on the junction between a portion 306 on a first side and a portion 308 on a second side. It is essential an identically magnetized portion always be on the same side of each gap.

The electromagnet is connected to an AC power source in a manner similar in all relevant respects to the connection of the electromagnet in FIG. 2. During AC operation, the permanent magnet will move in reciprocal periodic motion along axis 310 with an amplitude (peak to peak) equal to the length of one portion 306 or 308 along axis 310.

Figure 16A:
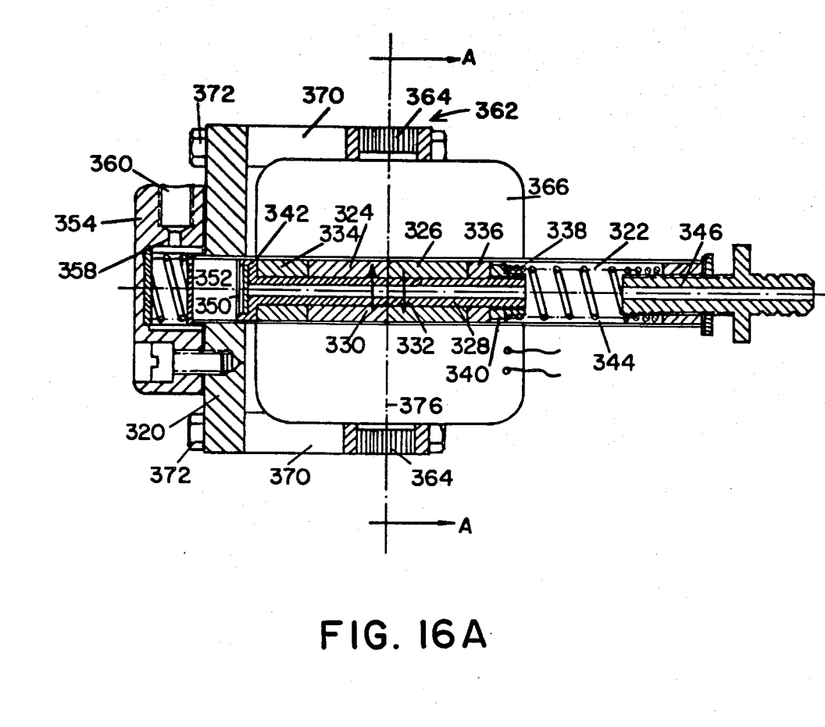
FIGS. 16A and 16B are respective side sectional and end views of a compressor constructed and operative in accordance with an embodiment of the present invention.
Figure 16B:
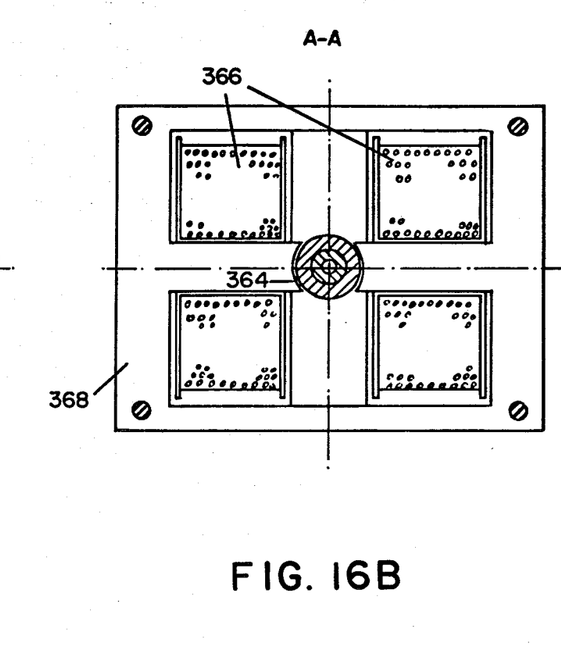

Reference is now made to FIGS. 16A and 16B which illustrate a gas compressor constructed and operative in accordance with an embodiment of the present invention. The compressor comprises a base 320 which supports a compressor tube 322. Disposed in compressor tube are two cylindrical magnets 324 and 326, each formed with a central elongate passageway through which extends a hollow gas flow tube 328.

Magnets 324 and 326 are disposed in side to side disposition and are arranged such that their respective axes of magnetization 330 and 332 are in opposite directions and perpendicular to the longitudinal axis of compressor tube 322. The outer diameter of cylindrical magnets 324 and 326 is slightly smaller than the inner diameter of the compressor tube 322. The magnets are secured together and for sliding engagement inside tube 322 with low frictional resistance on longitudinal bearings 334 and 336, typically formed of Rulon, and of outer diameter slightly greater than that of magnets 324 and 326.

Gas flow tube 328 effectively bolts together the bearings 334 and 336 and the magnets 324 and 326 and is formed with a threaded end 338 which is engaged by a nut 340. The opposite end of gas flow tube 328 is provided with a flange 342 which secures it against bearing 334.

Adjacent threaded end 338 there is disposed a spring 344 which when compressed by magnet movement towards it, urges the magnets back to a middle position. It is a particular feature of the present invention that spring 344 need not be attached either to end 338 to a gas inlet 346 disposed at the end of compressor tube 322 in sealed engagement therewith as by a washer 348, and which serves as a fixed spring mount.

At the end of gas flow tube 328 opposite to end 338 there is provided a one way valve 350 which only permits gas flow out of the gas tube.

Compressor tube 322 terminates at a second one way valve 352 which is mounted on base 320 by a gas outlet housing 354 and which only permits gas flow from the compressor tube 322 into the outlet housing. A spring 356 disposed in housing 354 forms part of the valve 352 and permits gas flow therepast and via a channel 358 to an outlet 360.

An AC electromagnet 362 comprising a core 364, wound coils 366 and outer securing brackets 368 is mounted on base 320 by spacer means 370 and connecting bolts 372. Electromagnet 362 defines a gap 374 across which there is produced a magnetic field along an axis 376, alternating in direction. This magnetic field causes reciprocal motion of permanent magnets 324 and 326 along the axis of the compressor tube, thus operating the compressor.

According to an alternative embodiment of the invention, the two permanent magnets 324 and 326 may be replaced by a single permanent magnet having a magnetization direction perpendicular to the axis of the compressor tube 322. In this case, however, the spring 344 must be attached to the moving magnet assembly and to the fixed spring support since it must pull the magnet back to its starting position.

It will be appreciated that while only a limited number of embodiments have been illustrated herein, the invention is not limited to what has been particularly shown and described herein. For example, although electromagnets with iron cores have been shown, the invention also extends to core-less electromagnets. Thus it is to be understood that the invention is limited only by the claims which follow:

I claim:

1. Apparatus producing linear motion for providing gas compression comprising:

a base;

a coil mounted on said base and adapted for receiving AC power and for producing an AC magnetic field across a gap;

a compressor tube mounted on said base, extending through said gap along a longitudinal axis of motion and defining a gas inlet and a gas outlet;

first one way valve means associated with said compressor tube;

a cylindrical permanent magnet disposed within said compressor tube for slidable motion relative thereto along said longitudinal axis of motion in the magnetic field in said gap and arranged to be driven in motion by the magnetic field, the permanent magnet comprising first and second cylindrical sections, magnetized in respective opposite directions and being configured such that their axes of magnetization lie along their smallest dimension and perpendicular to said longitudinal axis of motion;

said cylindrical permanent magnet being formed with an elongate longitudinal passageway extending therethrough for permitting gas passage; and second one way valve means associated with said elongate longitudinal passageway;

whereby movement of said permanent magnet in said compressor tube provides a forced gas flow via said longitudinal passageway.

2. Apparatus according to claim 1 and wherein said first and second sections are securely joined together to define a single rigid body.

3. Apparatus according to claim 1 and wherein said first and second sections are formed of a unitary element.

* * * * *